United States Patent
Sato et al.

(10) Patent No.: US 6,677,692 B1
(45) Date of Patent: Jan. 13, 2004

(54) ROTOR OF SMALL-SIZED MOTOR

(75) Inventors: Junji Sato, Tokorozawa (JP); Eikichi Sashida, Tanashi (JP); Hideharu Miyauchi, Tanashi (JP); Yousuke Sakakibara, Tokorozawa (JP); Hiroshi Ikeda, Tokorozawa (JP); Eigo Hashimoto, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/673,750
(22) PCT Filed: Apr. 23, 1999
(86) PCT No.: PCT/JP99/02189
§ 371 (c)(1), (2), (4) Date: Oct. 20, 2000
(87) PCT Pub. No.: WO99/54986
PCT Pub. Date: Oct. 28, 1999

(30) Foreign Application Priority Data

Apr. 23, 1998 (JP) .............................. 10-113043
Sep. 3, 1998 (JP) ............................ 10-249376

(51) Int. Cl.[7] ..................... H02K 89/00; H02K 21/12; H02K 1/22
(52) U.S. Cl. ............. 310/89; 310/156.08; 310/156.09; 310/156.21; 310/156.23; 310/156.32; 310/261; 310/40 MM
(58) Field of Search .................... 310/89, 156.08, 310/156.09, 156.12, 156.14, 156.18, 156.21, 156.22, 156.23, 156.26, 156.31, 156.32, 156.27, 42, 40 MM, 261

(56) References Cited

U.S. PATENT DOCUMENTS

| 3,949,251 A | * | 4/1976 | Takatsuki ............. 310/156.08 |
| 4,035,677 A | * | 7/1977 | Kusayama et al. ........... 310/42 |
| 4,167,416 A | * | 9/1979 | Zolla ........................ 106/1.25 |
| 4,206,379 A | * | 6/1980 | Onda ..................... 310/156.12 |

(List continued on next page.)

FOREIGN PATENT DOCUMENTS

| CH | 688 351 | 12/1988 |
| DE | 10 43 540 | 11/1958 |

(List continued on next page.)

Primary Examiner—Burton S. Mullins
Assistant Examiner—Julio C. Gonzalez
(74) Attorney, Agent, or Firm—Finnegan, Henderson, Farabow, Garrett & Dunner, L.L.P.

(57) ABSTRACT

A rotor (10) for a miniature electric motor includes a magnet (12) having a rotation axis (14) and a shaft (16) fixed concentrically to the magnet. The magnet (12) includes a through hole (20) extending coaxially with the rotation axis (14). The shaft (16) includes a portion (24) fitted in the through hole (20). The portion (24) has an axial interengagement length ($t_1$) shorter than an axial length ($T_1$) of the through hole (20). The rotor (10) also includes reinforcing means provided at least inside the through hole (20). The magnet (12) comprises an annular magnet material (18), and a coating (22) formed on a surface of the magnet material and arranged at least inside the through hole (20). The reinforcing means is formed as the coating (22) of the magnet (12), and acts to ensure a fixing force to securely hold the shaft (16) in a predetermined position on the magnet.

28 Claims, 6 Drawing Sheets

U.S. PATENT DOCUMENTS

| | | | |
|---|---|---|---|
| 4,334,166 A * | 6/1982 | Miyahara et al. ............ 310/268 |
| 4,412,144 A * | 10/1983 | Denisov et al. ......... 310/156.08 |
| 4,739,427 A * | 4/1988 | Kilmer ........................ 360/97 |
| 4,888,507 A | 12/1989 | Plancon et al. ................ 310/40 |
| 4,900,958 A * | 2/1990 | Kitahara et al. ........... 310/67 R |
| 5,081,388 A * | 1/1992 | Chen .................... 310/156.01 |
| 5,121,605 A * | 6/1992 | Oda et al. ..................... 290/52 |
| 5,183,972 A * | 2/1993 | Duane et al. ................ 174/251 |
| 5,283,495 A * | 2/1994 | Wendel et al. ......... 251/129.11 |
| 5,314,756 A * | 5/1994 | Tagaya ....................... 428/546 |
| 5,424,632 A * | 6/1995 | Montagu .................... 324/146 |
| 5,627,423 A * | 5/1997 | Marioni ................. 310/156.23 |
| 5,677,581 A * | 10/1997 | Yoshida et al. ......... 310/156.08 |
| 5,684,352 A * | 11/1997 | Mita et al. ................... 310/152 |
| 5,780,944 A * | 7/1998 | Sakamoto .............. 310/156.26 |
| 6,046,526 A * | 4/2000 | Maruyama ............ 310/323.06 |
| 6,081,056 A * | 6/2000 | Takagi ........................ 310/89 |
| 6,160,334 A * | 12/2000 | Teshima .................. 310/67 R |
| 6,169,354 B1 * | 1/2001 | Springer et al. ............ 310/268 |
| 6,172,438 B1 * | 1/2001 | Sakamoto .............. 310/156.26 |

FOREIGN PATENT DOCUMENTS

| | | | | |
|---|---|---|---|---|
| DE | 29 00 756 | | 7/1979 | |
| JP | 51-81909 | | 7/1976 | |
| JP | 54-71610 | | 5/1979 | |
| JP | 354099473 A | * | 8/1979 | |
| JP | 354113020 A | * | 9/1979 | |
| JP | 354119607 A | * | 9/1979 | |
| JP | 56-71078 | | 6/1981 | |
| JP | 356110469 A | * | 9/1981 | |
| JP | 56162555 | | 3/1982 | |
| JP | 56162954 | | 3/1982 | |
| JP | 57-21842 | | 5/1982 | |
| JP | 361001246 A | * | 1/1986 | |
| JP | 61-130436 | | 6/1986 | |
| JP | 62-236345 | | 10/1987 | |
| JP | 63093105 A | * | 4/1988 | ................ 29/602.1 |
| JP | 63-164365 | | 10/1988 | |
| JP | 402307341 A | * | 12/1990 | |
| JP | 406217479 A | * | 8/1994 | |
| JP | 407312859 A | * | 11/1995 | |
| JP | 410271724 A | * | 10/1998 | |

* cited by examiner

ROTOR OF SMALL-SIZED MOTOR

TECHNICAL FIELD

The present invention relates generally to a miniature drive unit and, more particularly, to a rotor for a miniature electric motor incorporated in, e.g., an electronic clock or watch.

BACKGROUND ARTS

An electronic clock or watch, such as a quartz watch, is provided with a miniature precision electric motor as a drive unit. The electric motor, generally structured as a stepping motor, used in the electronic clock includes a rotor with an annular or cylindrical permanent magnet and a stator with a coil. The rotor is also provided with a shaft concentric with and secured to the cylindrical permanent magnet, and a driving toothed wheel generally integrally formed on the shaft.

In the rotor of a conventional miniature electric motor incorporated in, e.g., an electronic clock, a rotor shaft is generally fixed in a center through hole formed in a rotor magnet by using a bonding material, such as an adhesive or solder, or by tightly press-fitting the shaft into the through hole. In this fixing operation, it is required to maintain a concentricity or alignment between the shaft and the annular or cylindrical rotor magnet, and to ensure a large and stable fixing force for securing the shaft in a predetermined proper position in the magnet. When the rotor shaft is tightly press-fitted into the through hole of the rotor magnet, it is also required to prevent the magnet from being broken or cracked due to the stress concentration, in a region adjacent to the through hole of the magnet, during the pressure-fitting operation of the shaft and for a long time after the rotor is completely assembled.

One example of the rotor of the conventional miniature motor in the electronic clock is disclosed in Japanese Unexamined Utility Model Publication (Kokai) No. 54-71610 (JP-U-54-71610). This motor rotor includes a shaft with a toothed wheel and a cylindrical permanent magnet with a center through hole for fixing the shaft. The rotor shaft is provided with a deformed profile such as a prism, and is tightly press-fitted into the cylindrical center through hole of the rotor magnet. In this structure, the shaft is in a local contact with the inner cylindrical surface of the magnet in the through hole at a part of the outer surface of the shaft, over the entire axial length of the through hole. This local contact of the shaft with the magnet serves to distribute a stress concentration into some local regions adjacent to the through hole of the magnet, which can prevent the magnet from being broken or cracked and also can ensure a large fixing force.

The annular or cylindrical permanent magnet of the conventional miniature motor rotor is generally formed from a sintered magnet made from rare-earth elements. A sintered permanent magnet normally has high magnetic performance, but tends to increase a production cost of a small, annular or cylindrical magnet structure. On the other hand, a permanent magnet with a simply molded structure, generally referred to as "a bonded magnet", is known to be capable of reducing such a production cost. However, when the annular or cylindrical magnet of the miniature motor rotor is formed from a bonded magnet, the mechanical strength of the rotor magnet is reduced in comparison with that of the sintered rotor magnet. Therefore, in this case, even if a rotor shaft has a structure as being described in JP-U-54-71610, the distributed stress concentration may cause the bonded rotor magnet to be broken or cracked during the press-fitting operation of the shaft or after the rotor is completed.

JP-U-54-71610 also discloses a bush interposed between the rotor shaft and the rotor magnet in the through hole, the bush being used to prevent the magnet from being broken or cracked. Such a bush is also disclosed in Japanese Unexamined Utility Model Publication (Kokai) No. 56-71078 (JP-U-56-71078). However, the additional use of the bush increases the number of parts of the motor rotor, and may deteriorate the productivity of the latter and increase the production cost thereof.

When the rotor shaft is fixed to the through hole of the rotor magnet by a bonding material such as an adhesive or solder, the shaft can be loosely fitted into the through hole, whereby the problems of breaking or cracking the magnet can be eliminated and relatively large fixing force can be established. However, a clearance between the shaft and the magnet in the through hole is normally very small in the order of several μm, so that the bonding material may overflow from the through hole as the shaft is inserted into the latter. Therefore, in this solution, it is necessary to carefully and precisely apply the bonding material to the very small clearance between the shaft and the magnet so as to ensure the large and stable fixing force, which may prevent mass production of the miniature motor rotor.

DISCLOSURE OF THE INVENTION

It is therefore an object of the present invention to provide a rotor, used in a miniature electric motor, which can be produced with a high structural reliability, a high yield and a relatively low cost.

It is another object of the present invention to provide a rotor including an annular or cylindrical magnet and a shaft fixed to the magnet, which can prevent the magnet from being broken or cracked due to the shaft, and can ensure a large and stable fixing force for securing the shaft in a predetermined position on the magnet.

It is further object of the present invention to provide a fixing structure, for fixing a shaft to an annular or cylindrical magnet, which can be suitably adopted for a process for producing a rotor having a relatively fragile magnet, such as a simply molded or bonded magnet.

In accordance with the present invention, there is provided a rotor, for an electric motor, comprising a magnet having a rotation axis, the magnet being provided with a through hole extending coaxially with the rotation axis; a shaft fixed concentrically to the magnet, the shaft including a portion fitted in the through hole, the portion having an axial interengagement length shorter than an axial length of the through hole; and reinforcing means provided at least inside the through hole for ensuring a fixing force to securely hold the shaft in a predetermined position in the magnet.

In a preferred aspect of the invention, the magnet comprises an annular magnet material and a coating formed on a surface of the magnet material and arranged at least inside the through hole, and the reinforcing means comprises the coating, the portion of the shaft being engaged with the coating in a face-to-face manner.

In this arrangement, it is preferred that the coating is made of a metal plating.

The metal plating may be an electroless plating.

Also, the metal plating may include at least one of a Ni—P electroless plating, a Ni—B electroless plating and a Ni—P—W electroless plating.

It is preferred that the metal plating has a thickness of at least 10 µm.

Alternatively, the metal plating may include an electroless plating base layer and an electroplating top layer.

In this arrangement, the electroplating top layer may be a Ni electroplating.

The electroless plating base layer may have a thickness in a range of 0.5 µm to 2.0 µm.

Also, the electroplating top layer may have a thickness of at least 3.0 µm.

Preferably, the magnet material is made of a bonded magnet material.

In this arrangement, a dimensional relationship between the axial interengagement length of the portion of the shaft and the axial length of the through hole may be defined as $T/5 \leq t \leq T/2$, in which "T" is the through hole axial length and "t" is the axial interengagement length.

Also, it is advantageous that, in an arrangement that the portion of the shaft is tightly press-fitted in the through hole of the magnet, an interference of the portion in the through hole is in a range of 5 µm to 30 µm.

Preferably, the bonded magnet material is vacuum-impregnated with a bonding agent or filler.

In another preferred aspect of the invention, the reinforcing means comprises an adhesive filled in a clearance defined between a reminder of the shaft other than the portion and the magnet inside the through hole.

In this arrangement, a dimensional relationship between the axial interengagement length of the portion of the shaft and the axial length of the through hole may be defined as $T/5 \leq t \leq 4T/5$, in which "T" is the through hole axial length and "t" is the axial interengagement length.

The adhesive may be a thermosetting epoxy resin.

The magnet may comprise an annular magnet material and a coating formed on a surface of the magnet material at least inside the through hole, and the reinforcing means may further comprise the coating, the portion of the shaft being engaged with the coating in a face-to-face manner.

In this arrangement, the coating may be made of a metal plating.

Alternatively, the coating may be made of an organic substance layer.

In this arrangement, it is preferred that the magnet material is made of a bonded magnet material.

The magnet may contain rare-earth elements.

In accordance with the present invention, there is also provided a method of producing a rotor for an electric motor, comprising the steps of (a) forming a coating on a surface of an annular magnet material and thereby providing a magnet having a rotation axis and a through hole extending coaxially with the rotation axis, the coating being arranged at least inside the through hole; (b) providing a shaft including a portion capable of being fitted in the through hole; and (c) inserting the shaft into the through hole of the magnet and tightly press-fitting the portion of the shaft in the through hole, until an axial interengagement length of the portion, shorter than an axial length of the through hole, is obtained.

In a preferred aspect of the invention, the magnet material may be made of a bonded magnet material, the coating may be a metal plating, and the method may further include a step of vacuum-impregnating the bonded magnet material with an adhesive before the step of forming the coating.

An interference of the portion in the through hole may be adjusted by changing a thickness of the coating.

The present invention further provides a method of producing a rotor, for an electric motor, comprising the steps of (a) providing a magnet having a rotation axis and a through hole extending coaxially with the rotation axis; (b) providing a shaft including a first portion capable of being fitted in the through hole and a second portion axially adjacent to the first portion for defining a clearance inside the through hole; (c) inserting the shaft into the through hole of the magnet and fitting the first portion of the shaft in the through hole, until an axial interengagement length of the first portion, shorter than an axial length of the through hole, is obtained; and (d) filling an adhesive in the clearance inside the through hole.

In a preferred aspect of the invention, the adhesive may be vacuum-impregnated into the clearance.

The magnet may be made of an annular bonded magnet material, and the method may further include a step of forming a coating on a surface of the bonded magnet material before the step of inserting the shaft.

BRIEF DESCRIPTION OF THE DRAWINGS

The above and other objects, features, and advantages of the present invention will become more apparent from the following description of preferred embodiments in connection with the accompanying drawings, in which.

BEST MODE FOR CARRYING OUT THE INVENTION

Figure 1:
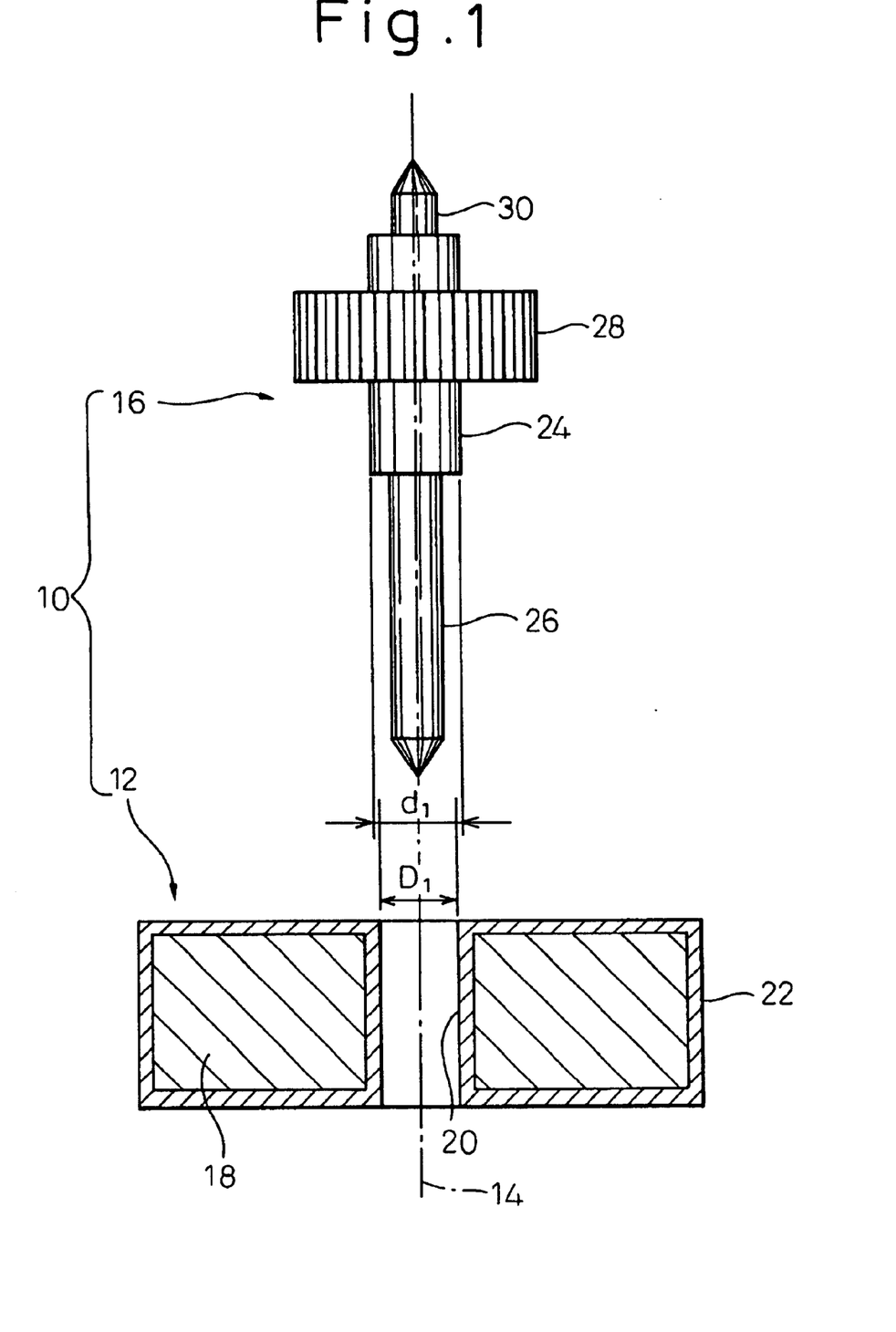
FIG. 1 is an exploded vertical view of a first embodiment of a rotor according to the present invention.
Figure 2:
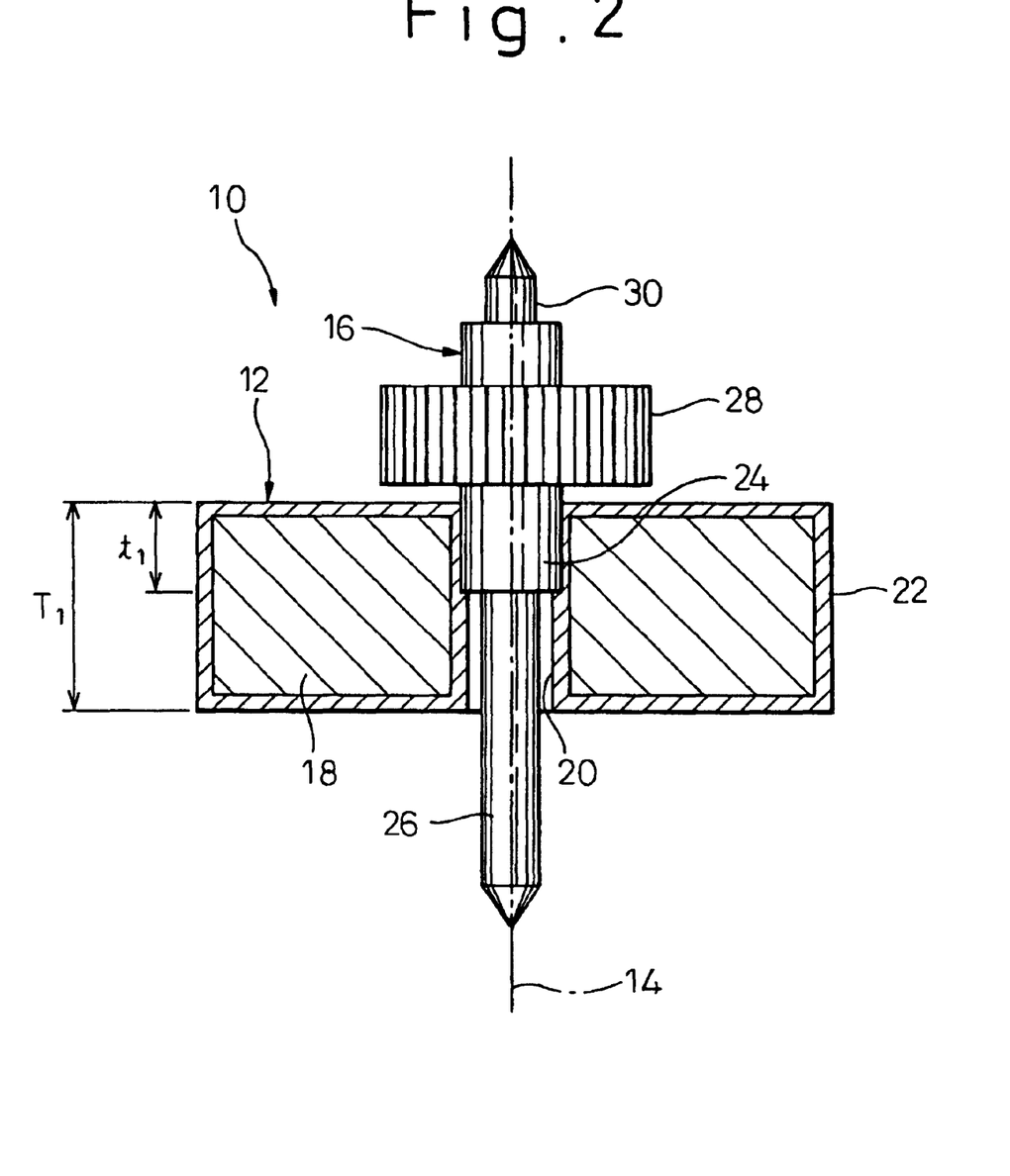
FIG. 2 is a vertical sectional view showing the assembled state of the rotor of FIG. 1.

Referring now to the drawings, in which same or similar components are denoted by common reference numerals, FIGS. 1 and 2 show a rotor 10 of a miniature electric motor, according to a first embodiment of the present invention. The rotor 10 of this embodiment may be used in a miniature precise electric motor incorporated in an electronic clock or watch.

The rotor 10 includes a magnet 12 having a rotation axis 14, and a shaft 16 fixed to and concentrically with the magnet 12. The magnet 12 is structured from an annular or cylindrical permanent magnet material 18, and is provided with a center cylindrical through hole 20 extending coaxially with the rotation axis 14. The magnet 12 is also provided with a coating 22 formed on an entire surface of the permanent magnet material 18. The coating 22 is made of a metal plating with a predetermined thickness, and defines the inner cylindrical surface of the magnet 12 inside the through hole 20 having a diameter "$D_1$".

The shaft 16 has a generally cylindrical shape with a stepped outer surface, and includes an intermediate portion 24 with a diameter "$d_1$". The diameter $d_1$ is selected so that the intermediate portion 24 is received and tightly press-fitted into the through hole 20 of the magnet 12 (i.e., $d_1 > D_1$).

The shaft 16 also includes a first end portion 26 coaxially adjacent to and extending from the intermediate portion 24, a toothed wheel 28 coaxially adjacent to and extending from the intermediate portion 24 and opposite to the first end portion 26, and a stepped second end portion 30 coaxially adjacent to and extending from the toothed wheel 28 and opposite to the intermediate portion 24. The first end portion 26 has a diameter smaller than the diameter $D_1$ of the through hole 20, and the toothed wheel 28 has a diameter larger than the diameter $d_1$ of the intermediate portion 24. The shaft 16 preferably has a one-piece or monolithic structure and is made of a metal.

The intermediate portion 24 and the first end portion 26 of the shaft 16 are inserted into the through hole 20, and the shaft 16 is concentrically fixed at a predetermined proper position on the magnet 12, due to the interengagement of the outer cylindrical surface of the intermediate portion 24 with the inner cylindrical surface of the magnet 12 inside the through hole 20. In this respect, the intermediate portion 24 is dimensioned so as to define an axial interengagement length "$t_1$" shorter than an entire axial length "$T_1$" of the through hole 20. When the shaft 16 is in the proper position on the magnet 12, the first end portion 26 projects from one side of the magnet 12, and the toothed wheel 28 and the second end portion 30 project from another side of the magnet 12.

The rotor 10 also includes reinforcing means provided at least inside the through hole 20 of the magnet 12, for ensuring fixing force to securely hold the shaft 16 in the predetermined position on the magnet 12. In this embodiment, the reinforcing means is structured by the above-mentioned coating 22 made of a metal plating. The intermediate portion 24 of the shaft 16 is engaged with the coating 22 in a face-to-face manner and tightly press-fitted with the latter inside the through hole 20.

In this structure, the shaft 16 is in contact with a part of the inner cylindrical surface of the magnet 12 in the through hole 20 at the outer cylindrical surface of the intermediate portion 24 of the shaft 16. Further, the magnet 12 is reinforced by the coating 22, with regard to the mechanical strength and toughness of the magnet 12. This partial contact of the shaft 16 with the magnet 12 cooperates with the reinforcement of the magnet 12 by the coating 22, so as to prevent the magnet 12 from being broken or cracked, during the press-fitting operation of the intermediate portion 24 into the through hole 20 and after the rotor 10 is completely assembled, and also to ensure a relatively large and stable fixing force. No additional part, such as a bush or an adhesive, is used to assemble the rotor 10, so that the rotor 10 can be produced with a high structural reliability, a high yield and a relatively low cost.

By suitably adjusting the axial interengagement length $t_1$ of the intermediate portion 24 of the shaft 16 with relation to the entire axial length $T_1$ of the through hole 20, as well as an interference "$d_1$ minus $D_1$" between the intermediate portion 24 and the magnet 12 in the through hole 20, the desired fixing force for securing the shaft 16 can be obtained while eliminating the breaking or cracking of the magnet 12, even if the magnet 12 is made of a relatively fragile magnet material 18, such as a simply molded or bonded magnet. The bonded magnet can further reduce the production cost of the miniature motor rotor 10 including the annular or cylindrical magnet 12, in comparison with the sintered magnet.

It should be noted that the desired fixing force is determined in consideration of the productivity and the structural reliability of the rotor 10, and is, for example, 0.2 Kgf in this embodiment. Also, it should be noted that the intermediate portion 24 of the shaft 16 may have a deformed profile such as a prism, as being described in the aforementioned JP-U-54-71610.

In the rotor 10 of the first embodiment, the magnet 12 may be structured by applying an electroless metal plating, as the coating 22, onto the entire surface of the cylindrical permanent magnet material 18. The permanent magnet material 18 may be made of a rare-earth bonded magnet, such as a SmCo (samarium/cobalt) type magnet, a NdFeB (neodymium/iron/boron) type magnet or a SmFeN (samarium/iron/nitrogen) type magnet. The electroless plating 22 may be of at least one of a Ni(nickel)—P(phosphorus) electroless plating, a Ni—B(boron) electroless plating and a Ni—P—W (tungsten) electroless plating.

Preferably, the permanent magnet material 18 made of a bonded magnet is vacuum-impregnated with a bonding agent or filler, so as to further improve the mechanical strength of the magnet 12. The bonded magnet is generally molded from magnetic powder with a binder being mixed therein, and therefore includes many air cavities in the molded structure. The bonding agent or filler, vacuum-impregnated to the molded magnet material 18, fills the cavities so as to enhance the mechanical breaking strength of the permanent magnet material 18, and to prevent the magnet 12 from being broken or cracked, during the press-fitting operation of the portion 24 into the through hole 20 and after the rotor 10 is completed, while cooperating with the electroless plating 22.

The bonding agent or filler may preferably be selected from liquid resinous materials capable of providing a relatively high adhesion force, low cost and easy handling, such as, an epoxy resin, a phenol resin, a thermosetting adhesive such as a polyurethane, or an anaerobic adhesive. An adhesive having good permeability and low viscosity may also be suitably selected from the viewpoint of the vacuum-impregnating process.

The electroless plating as the coating 22 serves to enhance the mechanical strength of the permanent magnet material 18 made of the bonded magnet. The electroless plating 22 also serves to prevent the magnetic powder from falling from the molded magnet material 18, during the press-fitting operation of the shaft 16. Preferably, the electroless plating 22 has a thickness of at least 10 μm. If the thickness of the electroless plating 22 is less than 10 μm, the improvement of the mechanical strength of the magnet 12 would be insufficient to prevent the breaking or cracking of the magnet 12. In view of ensuring a coating thickness control in a process for producing the electroless plating 22, it is preferred that the thickness of the electroless plating 22 is at most 30 μm.

In the rotor 10, it is preferred that a dimensional relationship between the axial interengagement length $t_1$ of the intermediate portion 24 of the shaft 16 and the entire axial length. $T_1$ of the through hole 20 of the magnet 12 is defined as $T_1/5 \leq t_1 \leq T_1/2$. If the axial interengagement length $t_1$ is less than $T_1/5$, the shaft 16 would be easily tilted in the through hole 20, which results in a misalignment of the shaft 16, regardless of the dimension of the interference between the magnet 12 and the shaft 16. If the axial interengagement length $t_1$ is more than $T_1/2$, the possibility of breaking or cracking the magnet 12 would increase.

It is also preferred, in the rotor 10, that the interference "$d_1$–(minus) $D_1$" between the intermediate portion 24 of the shaft 16 and the magnet 12 in the through hole 20 is in a range of 5 μm to 30 μm. If the interference "$d_1$–$D_1$" is less than 5 μm, the desired fixing force (e.g., 0.2 Kgf) for the shaft 16 on the magnet 12 would not be obtained. If the interference "$d_1-D_1$" is more than 30 μm, the possibility of breaking or cracking the magnet 12 would increase, even when the axial interengagement length $t_1$ is at most $T_1/2$.

Figure 3:
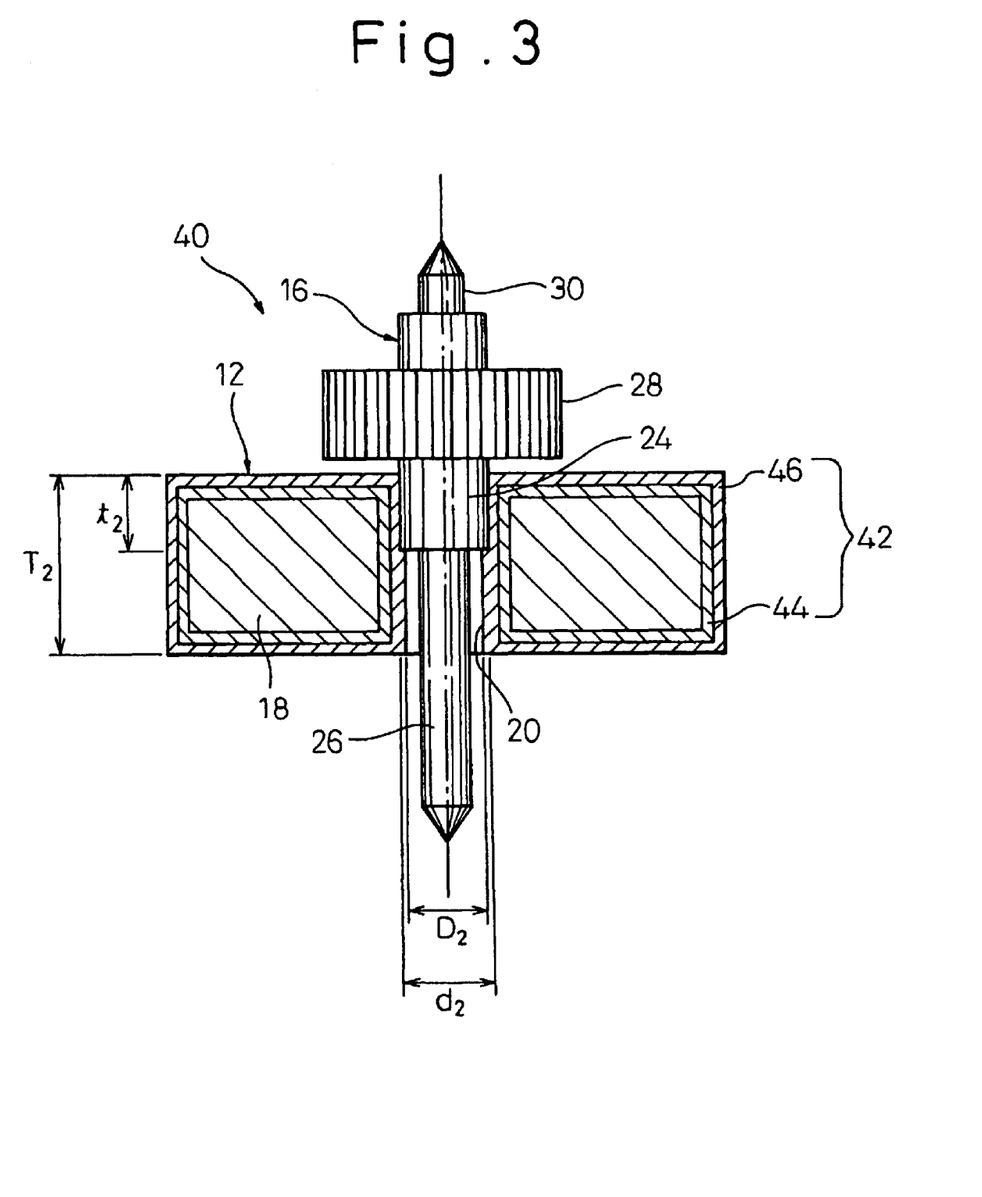
FIG. 3 is a vertical sectional view of a second embodiment of a rotor according to the present invention, showing the assembled state thereof.

FIG. 3 shows a rotor 40 of a miniature electric motor, according to a second embodiment of the present invention. The rotor 40 of this embodiment is provided with a structure essentially similar to the structure of the above-mentioned rotor 10, except that a coating 42, as reinforcing means, is structured as a double-layered metal plating. Therefore, same or similar components are denoted by common reference numerals, and the detailed description thereof are not repeated.

The coating 42 in the rotor 40, made of a double-layered metal plating, includes an electroless plating base layer 44 and an electroplating top layer 46. Accordingly, in the rotor 40, the electroplating top layer 46 of the coating 42 defines the inner cylindrical surface of the magnet 12 inside the through hole 20 which has a diameter $D_2$ smaller than the diameter $d_2$ of the intermediate portion 24 of the shaft 16. This double-layered structure of the coating 42 serves to reduce the entire thickness of the coating 42 in comparison with the single layer coating 22 in the rotor 10, without deteriorating the reinforcement effect thereof, since the electroplating top layer 46 has in itself a higher mechanical strength than an electroless plating having the same thickness and can be securely attached to the surface of the electroless plating base layer 44.

The electroless plating base layer 44 may be of at least one of a Ni—P electroless plating, a Ni—B electroless plating and a Ni—P—W electroless plating. The electroplating top layer 46 may be of a Ni plating. The inventors of the present invention have found that every one of the Ni—P electroless plating, the Ni—B electroless plating, the Ni—P—W electroless plating and the Ni electroplating has relatively high rigidity and high Young's modulus, and thus can more effectively improve the breaking strength of the magnet 12 and can obtain the higher stable fixing force for the shaft 16, in comparison with the other metal plating made of, such as Cu(copper), Pd(palladium), AU(gold), Sn(tin), solder(Pb/Sn type), etc., every one of which has relatively high spreading properties and relatively low rigidity. Preferably, the electroless plating base layer 44 has a thickness in a range of 0.5 μm to 2.0 μm. Also, it is preferred that the electroplating top layer 46 has a thickness of at least 3.0 μm.

The constitution and the characteristic effect of the above embodiments of the present invention will be more clearly described below, with reference to the results of some experiments for the validity of the invention.

EXPERIMENT 1

In the rotor 10 shown in FIGS. 1 and 2, the permanent magnet material 18 was made of an anisotropic bonded magnet of rare-earth elements formed from a $Sm_2Co_{17}$ type magnetic powder and an epoxy resin binder, the shaft 16 was made of a carbon steel "JIS SK4", and the coating 22 was formed as a Ni—P electroless plating. The shaft 16 had a monolithic or integral body including the toothed wheel 28. The annular or cylindrical permanent magnet material 18 was dimensioned as 1250 μm (outer diameter)×350 μm (inner diameter)×460 μm (axial length). The bonded magnet used for the permanent magnet material 18 was produced through a compression molding process in a magnetic field, from a compound including the $Sm_2Co_{17}$ type magnetic powder having an average particle diameter of 10 μm (measured by a Fischer's method) and 3 weight % of epoxy resin binder. This bonded magnet included air cavities to 20 to 40 volume %.

Then, the magnet material 18 was vacuum-impregnated with a thermosetting liquid epoxy resin to fill the air cavities, so as to enhance the mechanical strength and the toughness of the permanent magnet material 18. To further improve the mechanical strength, Ni—P electroless plating 22 having a uniform thickness of 20 μm was formed on the entire surface of the permanent magnet material 18 through an electroless plating process. Thereby, the magnet 12 was completed, in which the inner diameter $D_1$ inside the through hole 20 was 310 μm and the entire axial length $T_1$ of the through hole 20 was 500 μm. The magnet 12 thus formed had an extreme breaking strength against a compression load in a radial direction, which was ten times, and more, that of the permanent magnet material 18. Note, if the electroless plating 22 tends to be provided with uneven thickness, it may be useful that the electroless plating 22 is formed so as to have a minimum thickness 20 μm, and that the through hole 20 is finished, in such a plated magnet blank, by using a 310 μm diameter drill.

Six types of the shaft 16 were provided, which respectively included the intermediate portions 24 having the diameter $d_1$ of 312 μm, 315 μm, 320 μm, 330 μm, 340 μm and 345 μm. Then, the shafts 16 were respectively inserted into the magnet 12 thus completed, and the intermediate portions 24 of the shafts 16 were respectively press-fitted into the through hole 20, until the respective axial interengagement lengths $t_1$ of 10 μm, 30 μm, 50 μm, 100 μm, 200 μm, 250 μm and 300 μm were obtained. In this way, the six types of the shafts 16 were respectively secured to the magnet 12, under the deformation of the magnet 12 especially in the wall of the electroless plating 22 inside the through hole 20, in different engagement conditions (the interference "$d_1-D_1$"; the axial interengagement length $t_1$).

For the respective types of rotors 10 thus provided, the fixing force (Kgf) for securing the respective shafts 16 (Table 1), the respective breaking states in the magnet 12 (Table 2) and the tilt or misalignment of the respective shafts 16 (Table 3) were estimated. The fixing force was determined by axially pushing the first end portion 26 of the shaft 16 secured in the through hole 20 of the magnet 12 and measuring the force required to shift the shaft 16 in the through hole 20 (or to pull out the shaft from the through hole 20). The results of these estimations are shown in the Tables 1 to 3.

TABLE 1

(Fixing Force: Kgf)

| | $d_1 - D_1$ (μm) | | | | | |
|---|---|---|---|---|---|---|
| $t_1$ (μm) | 2 | 5 | 10 | 20 | 30 | 35 |
| 10 | 0.01 | 0.03 | 0.09 | 0.54 | 0.95 | 2.05 |
| 30 | 0.05 | 0.07 | 0.10 | 0.85 | 1.56 | — |
| 50 | 0.08 | 0.22 | 0.90 | 1.40 | 1.90 | — |
| 100 | 0.12 | 0.35 | 1.25 | 2.32 | 2.81 | — |
| 200 | 0.14 | 0.59 | 1.50 | 2.70 | 3.40 | — |
| 250 | 0.18 | 0.81 | 2.32 | 2.72 | 3.90 | — |
| 300 | 0.01 | 0.02 | — | — | — | — |

(—: less than 0.01 Kgf)

TABLE 2

(Breaking of Magnet)

| $t_1$ (μm) | $d_1 - D_1$ (μm) | | | | | |
|---|---|---|---|---|---|---|
| | 2 | 5 | 10 | 20 | 30 | 35 |
| 10 | ○ | ○ | ○ | ○ | ○ | ○ |
| 30 | ○ | ○ | ○ | ○ | ○ | X |
| 50 | ○ | ○ | ○ | ○ | ○ | X |
| 100 | ○ | ○ | ○ | ○ | ○ | X |
| 200 | ○ | ○ | ○ | ○ | ○ | X |
| 250 | ○ | ○ | ○ | ○ | ○ | X |
| 300 | X | X | X | X | X | X |

(○: unbroken   X: broken)

TABLE 3

(Misalignment of Shaft)

| $t_1$ (μm) | $d_1 - D_1$ (μm) | | | | | |
|---|---|---|---|---|---|---|
| | 2 | 5 | 10 | 20 | 30 | 35 |
| 10 | X | X | X | X | X | X |
| 30 | X | X | X | X | X | — |
| 50 | X | X | X | X | X | — |
| 100 | ○ | ○ | ○ | ○ | ○ | — |
| 200 | ○ | ○ | ○ | ○ | ○ | — |
| 250 | ○ | ○ | ○ | ○ | ○ | — |
| 300 | — | — | — | — | — | — |

(○: aligned   X: misaligned   —: unestimated (broken))

As will be understood from the results of the above estimations, when the interference $d_1-D_1$ between the intermediate portion 24 of the shaft 16 and the magnet 12 inside the through hole 20 was less than 5 μm, the fixing force of 0.2 Kgf, which is generally required for the rotor of a miniature electric motor incorporated in an electronic clock or watch, could not be obtained. When the interference exceeded 30 μm, the magnet 12 was broken in most of cases of the axial interengagement lengths $t_1$, during the press-fitting operation of the shaft 16 into the through hole 20. When the axial interengagement length $t_1$ was less than 100 μm, the shaft 16 was tilted or misaligned in the through hole 20. When the axial interengagement length $t_1$ exceeded 250 μm, the magnet 12 was broken in every case of the interferences $d_1-D_1$, during the press-fitting operation of the shaft 16. Consequently, it is required to select the axial interengagement length $t_1$ in the range of 100 μm to 250 μm (i.e., $T_1/5 \leq t_1 \leq T_1/2$), and also to select the interference $d_1-D_1$ in the range of 5 μm to 30 μm.

As is apparent from the above, the rotors 10, having the estimated results underlined in the respective tables 1 to 3, are adoptable for the invention, wherein the magnet 12 is prevented from being broken or cracked due to the shaft 16, wherein the desired fixing force of at least 0.2 Kgf is obtained, and wherein the tilt or misalignment of the shaft 16 is eliminated. By selecting any of the underlined sample rotors 10, the rotor 10 can be assembled in a mass-production by the simple press-fitting process of the shaft 16 into the through hole 20, even when the dimensional unevenness of the diameter of the intermediate portion 24 of the shaft 16 is taken into consideration.

The dimension of the magnet 12 of the rotor 10 according to the present invention, suitably used for a miniature electric motor incorporated in an electronic clock or watch, can be designed so that the outer diameter is in the range of 800 μm to 1500 μm, the inner diameter is in the range of 250 μm to 500 μm, the axial length is in the range of 400 μm to 800 μm, and the plating thickness is in the range of 10 μm to 30 μm. When the dimension of the magnet 12 is selected in the above range, the above-described effects of the present invention can be obtained.

It should be noted that, in the above experiments, the dimension of the interference $d_1-D_1$ between the intermediate portion 24 of the shaft 16 and the magnet 12 inside the through hole 20 can also be adjusted by modifying the thickness of the coating or metal plating 22, in place of modifying the diameter of the intermediate portion 24. Further, the bonding agent or filler, vacuum-impregnated in the permanent magnet material 18, may also be selected from a phenol resin, a thermosetting adhesive such as a polyurethane, and an anaerobic adhesive, in place of the epoxy resin. Every one of these fillers is a liquid resinous material, capable of establishing relatively high adhesion force and easy handling, which results in similar effects.

EXPERIMENT 2

In the rotor 40 shown in FIG. 3, the permanent magnet material 18 was made of an anisotropic bond magnet of rare-earth elements, formed from a $Sm_2Co_{17}$ type magnetic powder and an epoxy resin binder, the shaft 16 was made of a carbon steel "JIS SK4", and the coating 42 included a Ni—P electroless plating base layer 44 and a Ni electroplating top layer 46. The shaft 16 had a monolithic or integral body including the toothed wheel 28. The annular or cylindrical permanent magnet material 18 was dimensioned as 1250 μm (outer diameter)×350 μm (inner diameter)×488 μm (axial length). The bonded magnet used for the permanent magnet material 18 was produced through a compression molding process in a magnetic field, from a compound including the $SM_2Co_{17}$ type magnetic powder having the average particle diameter of 10 μm (measured by a Fischer's method) and the epoxy resin binder of 3 weight %. This bonded magnet included air cavities of 20 to 40 volume %.

Then, the magnet material 18 was vacuum-impregnated with a thermosetting liquid epoxy resin to fill the air cavities, so as to enhance the mechanical strength and the toughness of the magnet material 18. To further improve the mechanical strength, the Ni—P electroless plating base layer 44 having a uniform thickness of 1 μm was formed on the entire surface of the permanent magnet material 18, and the Ni electroplating top layer 46 having a uniform thickness of 5 μm was formed on the entire surface of the base layer 44. Thereby, the magnet 12, in which the inner diameter $D_2$ inside the through hole 20 was 338 μm and the entire axial length $T_2$ of the through hole 20 was 500 μm, was completed. The magnet 12 thus formed had a extreme breaking strength against a compression load in a radial direction, which was ten times, and move, that of the permanent magnet material 18. Note, if the double-layered metal plating 42 tends to be provided with uneven thickness, it may be useful that the metal plating 42 is formed so as to have a minimum thickness 6 μm, and that the through hole 20 is finished on such a plated magnet blank by using a 338 μm diameter drill.

Six types of the shaft 16 were provided, which respectively included the intermediate portions 24 having the diameter $d_2$ of 340 μm, 343 μm, 348 μm, 358 μm, 368 μm and 373 μm. Then, the shafts 16 were respectively inserted into the magnet 12 thus completed, and the intermediate portions 24 of the shafts 16 were respectively press-fitted into the through hole 20, until the respective axial interengagement lengths $t_2$ of 10 μm, 30 μm, 50 μm, 100 μm, 200 μm, 250 μm and 300 μm were obtained. In this way, the six types of the shafts 16 were respectively secured to the magnet 12, under the deformation of the magnet 12 especially in the wall of the metal plating 42 inside the through hole 20, in different engagement conditions (the interference "$d_2$-(minus) $D_2$"; the axial interengagement length $t_2$).

For the respective types of rotors 40 thus provided, the fixing force (Kgf) for securing the respective shafts 16 (Table 4), the respective breaking states of the magnet 12 (Table 5) and the tilt or misalignment of the respective shafts 16 (Table 6) were estimated. The fixing force was determined by axially pushing the first end portion 26 of the shaft 16 secured in the through hole 20 of the magnet 12 and measuring the force required to shift the shaft 16 in the through hole 20 (or to pull the shaft out from the through hole 20). The results of these estimations are shown in the Tables 4 to 6.

TABLE 4

(Fixing Force: Kgf)

| | $d_2$ - $D_2$ (μm) | | | | | |
|---|---|---|---|---|---|---|
| $t_2$ (μm) | 2 | 5 | 10 | 20 | 30 | 35 |
| 10 | 0.02 | 0.05 | 0.11 | 0.64 | 0.99 | 2.29 |
| 30 | 0.06 | 0.09 | 0.13 | 0.95 | 1.86 | — |
| 50 | 0.09 | 0.25 | 0.93 | 1.40 | 2.03 | — |
| 100 | 0.12 | 0.39 | 1.45 | 2.42 | 2.91 | — |
| 200 | 0.15 | 0.67 | 1.60 | 2.90 | 3.60 | — |
| 250 | 0.19 | 0.91 | 2.52 | 2.92 | 3.99 | — |
| 300 | 0.02 | — | — | — | — | — |

(—: less than 0.01 Kgf)

TABLE 5

(Breaking of Magnet)

| | $d_2$ - $D_2$ (μm) | | | | | |
|---|---|---|---|---|---|---|
| $t_2$ (μm) | 2 | 5 | 10 | 20 | 30 | 35 |
| 10 | ◯ | ◯ | ◯ | ◯ | ◯ | ◯ |
| 30 | ◯ | ◯ | ◯ | ◯ | ◯ | X |
| 50 | ◯ | ◯ | ◯ | ◯ | ◯ | X |
| 100 | ◯ | ◯ | ◯ | ◯ | ◯ | X |
| 200 | ◯ | ◯ | ◯ | ◯ | ◯ | X |
| 50 | ◯ | ◯ | ◯ | ◯ | ◯ | X |
| 300 | X | X | X | X | X | X |

(◯: unbroken X: broken)

TABLE 6

(Misalignment of Shaft)

| | $d_2$ - $D_2$ (μm) | | | | | |
|---|---|---|---|---|---|---|
| $t_2$ (μm) | 2 | 5 | 10 | 20 | 30 | 35 |
| 10 | X | X | X | X | X | X |
| 30 | X | X | X | X | X | — |
| 50 | X | X | X | X | X | — |
| 100 | ◯ | ◯ | ◯ | ◯ | ◯ | — |
| 200 | ◯ | ◯ | ◯ | ◯ | ◯ | — |
| 250 | ◯ | ◯ | ◯ | ◯ | ◯ | — |

TABLE 6-continued (Misalignment of Shaft)

| | $d_2$ - $D_2$ (μm) | | | | | |
|---|---|---|---|---|---|---|
| $t_2$ (μm) | 2 | 5 | 10 | 20 | 30 | 35 |
| 300 | — | — | — | — | — | — |

(◯: aligned X: misaligned —: unestimated (broken))

As will be understood from the results of the above estimations, when the interference $d_2$-$D_2$ between the intermediate portion 24 of the shaft 16 and the magnet 12 inside the through hole 20 was less than 5 μm, the fixing force of 0.2 Kgf, which is generally required for the rotor of a miniature electric motor incorporated in an electronic clock or watch, could not be obtained. When the interference exceeded 30 μm, the magnet 12 was broken in most cases of the axial interengagement lengths $t_2$, during the press-fitting operation of the shaft 16 into the through hole 20. When the axial interengagement length $t_2$ was less than 100 μm, the shaft 16 was tilted or misaligned in the through hole 20. When the axial interengagement length $t_2$ exceeded 250 μm, the magnet 12 was broken in every case of the interferences $d_2$-$D_2$ during the press-fitting operation of the shaft 16. Consequently, it is required to select the axial interengagement length $t_2$ in the range of 100 μm to 250 μm (i.e., $T_2/5 \leq t_2 \leq T_2/2$), and also to select the interference $d_2$-$D_2$ in the range of 5 μm to 30 μm.

As is apparent from the above, the rotors 40, having the estimated results underlined in the respective tables 4 to 6, are adoptable for the invention, wherein the magnet 12 is prevented from being broken or cracked due to the shaft 16, wherein the desired fixing force of at least 0.2 Kgf is obtained, and wherein the tilt or misalignment of the shaft 16 is eliminated. By selecting any of the underlined sample rotors 40, the rotor 40 can be assembled by mass-production by a simple press-fitting process of the shaft 16 into the through hole 20, even when the dimensional unevenness of the diameter of the intermediate portion 24 of the shaft 16 is taken into consideration.

The dimension of the magnet 12 of the rotor 40 according to the present invention, suitably used for a miniature electric motor incorporated in an electronic clock or watch, can be designed so that the outer diameter is in a range of 800 μm to 1500 μm, the inner diameter is in a range of 250 μm to 500 μm, the axial length is in a range of 400 μm to 800 μm, and the double-layered plating thickness is in a range of 3 μm to 30 μm. When the dimension of the magnet 12 is selected in the above range, the above-described effects of the present invention can be obtained. When the double-layered plating thickness is 5 μm, generally the same results as in the rotor 10 having the single-layered plating thickness of 20 μm, was obtained. The coating thickness of such a relatively thinner double-layered plating 42 can be easily controlled.

It should be noted that, in the above experiments, the dimension of the interference $d_2$-$D_2$ between the intermediate portion 24 of the shaft 16 and the magnet 12 inside the through hole 20 can also be adjusted by modifying the thickness of the coating or metal plating 42, in place of modifying the diameter of the intermediate portion 24. Further, the bonding agent or filler, vacuum-impregnated in the permanent magnet material 18, may also be selected from a phenol resin, a thermosetting adhesive such as a polyurethane, and an anaerobic adhesive, in place of the epoxy resin. Every one of these fillers is a liquid resinous material capable of providing relatively high adhesion force and easy handling, and which results in similar effects.

Figure 4:
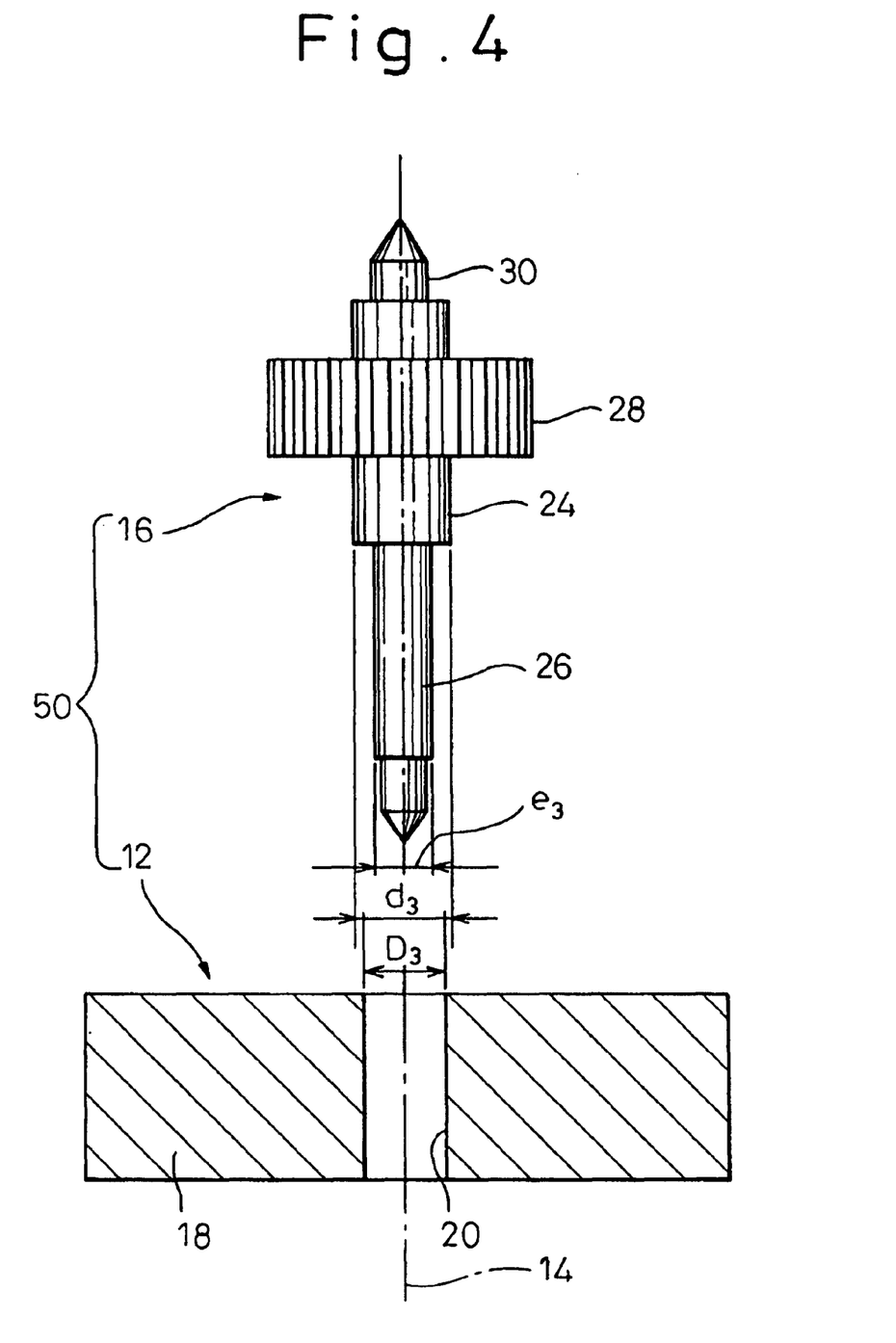
FIG. 4 is an exploded vertical sectional view of a third embodiment of a rotor according to the present invention.
Figure 5:
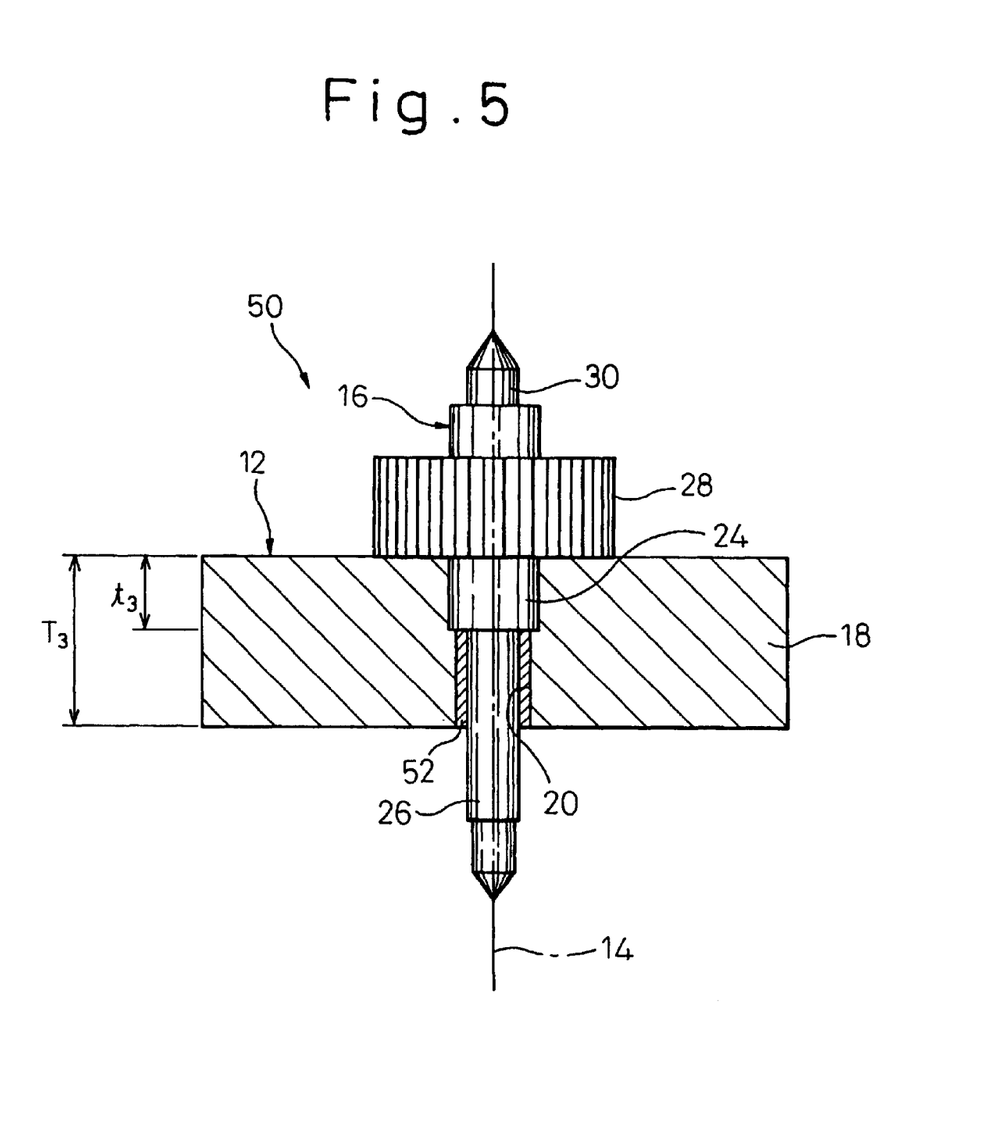
FIG. 5 is a vertical sectional view showing the assembled state of the rotor of FIG. 4.

FIGS. 4 and 5 show a rotor 50 of a miniature electric motor, according to a third embodiment of the present invention. The rotor 50 of this embodiment is provided with a structure essentially similar to the structure of the above-mentioned rotor 10, except for the structure of reinforcing means. Therefore, same or similar components are denoted by common reference numerals, and the detailed description thereof are not repeated.

The magnet 12 of the rotor 50 has no coating and is structured from the annular or cylindrical permanent magnet material 18. Accordingly, the surface of the permanent magnet material 18 defines the center cylindrical through hole 20 extending coaxially with the rotation axis 14, and also the inner cylindrical surface of the magnet 12 inside the through hole 20 having a diameter "$D_3$".

The shaft 16 of the rotor 50 includes the intermediate portion 24 with a diameter "$d_3$". The diameter $d_3$ is selected so that the intermediate portion 24 is received and somewhat loosely press-fitted or fitted into the through hole 20 of the magnet 12 (i.e., $d_3$ is slightly larger than $D_3$). The first end portion 26 of the shaft 16 has a diameter "$e_3$" smaller than the diameter $D_3$ of the through hole 20.

The intermediate portion 24 and the first end portion 26 of the shaft 16 are inserted into the through hole 20, and the shaft 16 is concentrically supported at a predetermined proper position on the magnet 12, due to the interengagement of the outer cylindrical surface of the intermediate portion 24 with the inner cylindrical surface of the magnet 12 inside the through hole 20. In this respect, the intermediate portion 24 is dimensioned so as to define the axial interengagement length "$t_3$" shorter than the entire axial length "$T_3$" of the through hole 20.

The rotor 50 also includes reinforcing means provided at least inside the through hole 20 of the magnet 12, for ensuring a fixing force to securely hold the shaft 16 in the predetermined position on the magnet 12. In this embodiment, the reinforcing means is structured by an adhesive 52 filled in a clearance defined between the first end portion 26 of the shaft 16 and the magnet 12 inside the through hole 20. The intermediate portion 24 of the shaft 16 is somewhat loosely engaged with the inner cylindrical surface of the magnet 12 in a face-to-face manner, and the adhesive 52 filled in the clearance defined in the through hole 20 serves to securely fix the shaft 16 inside the through hole 20, so as to establish the desired fixing force.

In this structure, the intermediate portion 24 of the shaft 16 is somewhat loosely press-fitted and temporarily attached into the through hole 20 of the magnet 12, so that the magnet 12 is prevented from being broken or cracked, during the press-fitting operation of the portion 24 into the through hole 20 and after the rotor 50 is completed. Then the relatively large and stable fixing force for the shaft 16 is ensured by the adhesive 52. The adhesive 52 is easily and surely filled in the clearance defined between the first end portion 26 of the shaft 16 and the magnet 12 inside the through hole 20 by, e.g., a vacuum-impregnating process, after the insertion of the shaft 16 into the through hole 20. Also, an additional part such as a bush is not used, which can reduce the number of parts of the rotor 50. Therefore, the rotor 50 can be produced with a high structural reliability, a high yield and a relatively low cost.

By suitably adjusting the axial interengagement length $t_3$ of the intermediate portion 24 of the shaft 16 with relation to the entire axial length $T_3$ of the through hole 20, as well as an interference "$d_3$ minus $D_3$" between the intermediate portion 24 and the magnet 12 in the through hole 20, the concentricity or alignment of the shaft 16 relative to the magnet 12 can be obtained while eliminating the breaking or cracking of the magnet 12. Also, by suitably adjusting an axial adhesion length "$T_3$ minus $t_3$" and a radial adhesion length "$D_3$ minus $e_3$" of the clearance defined between the first end portion 26 of the shaft 16 and the magnet 12 inside the through hole 20, which are occupied by the adhesive 52, the desired stable fixing force for the shaft 16 can be obtained. This structure can be applied to both the sintered magnet structure and the bonded magnet structure.

It should be noted that the desired fixing force is determined in consideration of the productivity and the structural reliability of the rotor 50, and is, for example, 0.2 Kgf. Also, it should be noted that the intermediate portion 24 of the shaft 16 may have a deformed profile such as a prism, as described in the aforementioned JP-U-54-71610.

In the rotor 50, it is preferred that a dimensional relationship between the axial interengagement length $t_3$ of the intermediate portion 24 of the shaft 16 and the entire axial length $T_3$ of the through hole 20 of the magnet 12 is defined as $T_3/5 \leq t_3 \leq 4T_3/5$. If the axial interengagement length $t_3$ is less than $T_3/5$, the shaft 16 would be easily tilted in the through hole 20, which results in a misalignment of the shaft 16 during the press-fitting operation of the shaft 16. If the axial interengagement length $t_3$ is more than $4T_3/5$, the axial adhesion length "$T_3$−(minus) $t_3$" would be shortened, which results in the difficulty for ensuring the desired stable fixing force for the shaft 16.

It is preferred, in the rotor 50, that the axial adhesion length "$T_3-t_3$" is at least 50 μm, so as to ensure the desired stable fixing force for the shaft 16, and to permit the adhesive 52 to be held in the clearance defined inside the through hole 20 during a washing process described below. It is also preferred that the radial adhesion length "$D_3$−(minus) $e_3$" is at least 2 μm, so as to ensure the desired stable fixing force for the shaft 16, and to permit the adhesive 52 to be easily filled in the clearance.

A surplus adhesive adhered on the outer surface of the magnet 12 outside the through hole 20, during the vacuum-impregnating process, can be readily removed and washed by an organic solvent, while keeping the adhesive 52 in the clearance inside the through hole 20. The vacuum-impregnating process for filling the clearance with the adhesive 52 makes it possible for a large number of (for example, ten thousand to million) rotors 50 to be processed all together at once, which is known as batch processing. Consequently, the production cost for the rotor 50 can be further reduced.

The adhesive 52 is preferably made of a thermosetting epoxy resin, since it has a relatively high adhesion force and ensures a stable productivity. That is, the wide pot life and the viscosity of the thermosetting epoxy resin can suitably and optionally adjusted at room temperature. The viscosity of the epoxy resin is preferred to be as low as possible, and the pot life at ordinary temperature is preferred to be as long as possible in view of the productivity.

Figure 6:
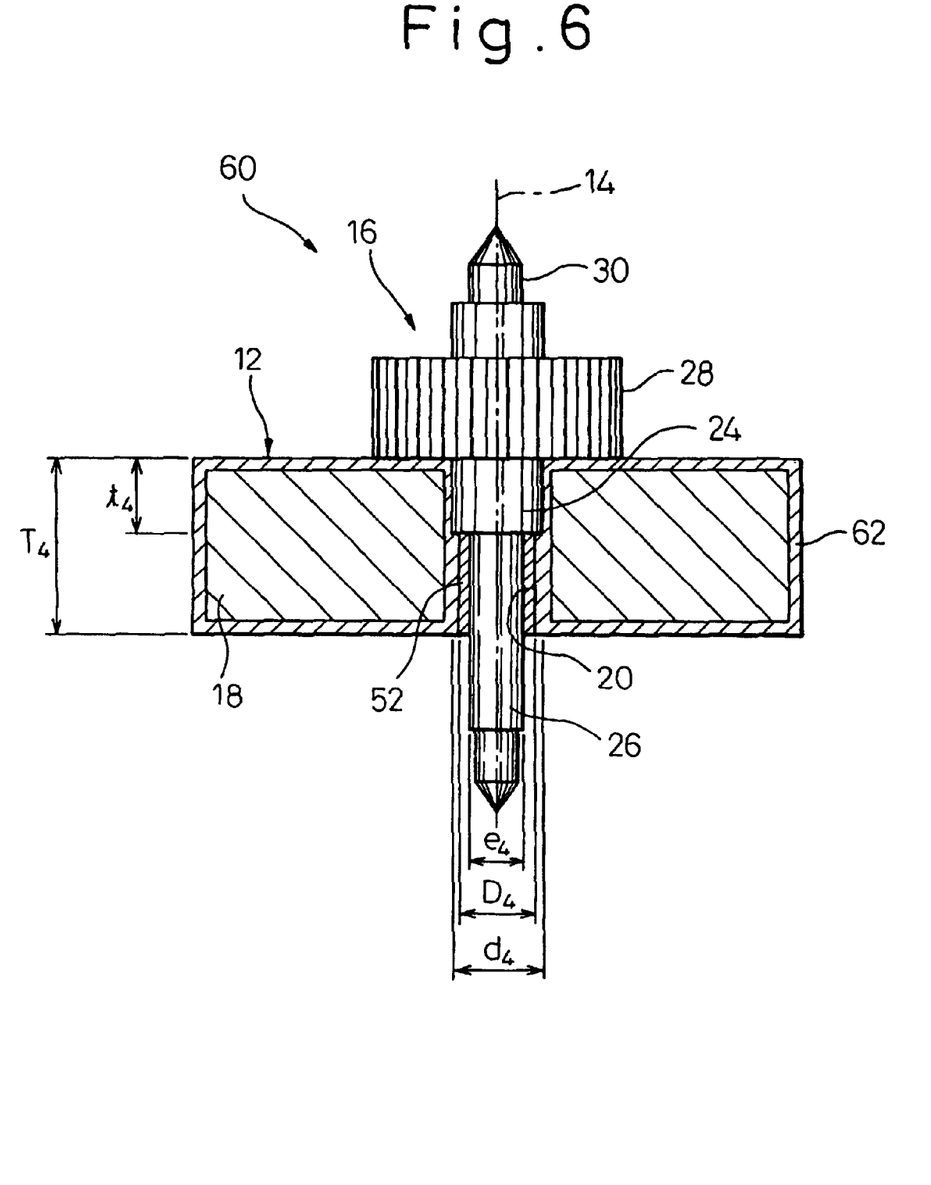
FIG. 6 is a vertical sectional view of a fourth embodiment of a rotor according to the present invention, showing the assembled state thereof.

FIG. 6 shows a rotor 60 of a miniature electric motor, according to a fourth embodiment of the present invention. The rotor 60 of this embodiment is provided with a structure essentially similar to the structure of the above-mentioned rotor 50, except that a coating 62 is formed on the magnet material 18. Therefore, same or similar components are denoted by common reference numerals, and detailed descriptions thereof are not repeated.

In the rotor 60, the magnet 12 is structured by the permanent magnet material 18 and the coating 62 formed on the entire surface of the permanent magnet material 18. Accordingly, the surface of the coating 62 defines the center cylindrical through hole 20 extending coaxially with the rotation axis 14, and also the inner cylindrical surface of the magnet 12 inside the through hole 20 having a diameter "$D_4$".

The intermediate portion 24 of the shaft 16 has a diameter "$d_4$" which is selected so that the intermediate portion 24 is received and somewhat loosely press-fitted or fitted into the through hole 20 of the magnet 12 (i.e., $d_4$ is slightly larger than $D_4$). The first end portion 26 of the shaft 16 has a diameter "$e_4$" smaller than the diameter $D_4$ of the through hole 20. Also, the intermediate portion 24 of the shaft 16 is dimensioned so as to define the axial interengagement length "$t_4$" shorter than the entire axial length "$T_4$" of the through hole 20.

The coating 62 serves as additional reinforcing means, cooperating with the adhesive 52 filled in the clearance defined between the first end portion 26 of the shaft 16 and the magnet 12 inside the through hole 20, for ensuring fixing force to securely hold the shaft 16 in the predetermined position on the magnet 12. That is, although the intermediate portion 24 of the shaft 16 is somewhat loosely engaged with the inner cylindrical surface of the magnet 12 in a face-to-face manner, the coating 62 serves to enhance the mechanical strength of the permanent magnet material 18, so as to effectively prevent the latter being broken or cracked due to the insertion of the shaft 16. Accordingly, this structure is especially suitable for a case wherein the permanent magnet material 18 is made of a relatively fragile magnet, such as a bonded magnet. In this case, the coating 62 also serves to prevent the magnetic powder from falling from the molded permanent magnet material 18 during the press-fitting operation of the shaft 16.

The coating 62 may be made of a metal plating. The metal plating 62 is preferably made of a Ni—P or Ni—P—W type electroless plating, to provide a generally uniform thickness over the entire surface of the permanent magnet material 18. Also, the metal plating 62 has preferably the thickness of at least 10 $\mu$m, to ensure the sufficient improvement of the mechanical strength of the magnet 12. Alternatively, in the rotor 60, the coating 62 may be made of an organic substance layer, since the intermediate portion 24 of the shaft 16 is somewhat loosely press-fitted in the through hole 20 of the magnet 12. In this arrangement, the organic substance layer 62 is preferably made of a sprayed coat of epoxy resin, a deposited coat of poly-para-xylene, an electro-deposition coating, etc. Also, the organic substance layer 62 has preferably the thickness of at least 20 $\mu$m, to ensure the sufficient improvement of the mechanical strength of the magnet 12.

The constitutions and the characteristic effects of the third and fourth embodiments of the present invention will be more clearly described below, with reference to the results of some experiments for the validity of the invention.

EXPERIMENT 3

In the rotor 50 shown in FIG. 4 and 5, the permanent magnet material 18 was made of a $Sm_2Co_{17}$ type sintered magnet, and the shaft 16 was made of a carbon steel "JIS SK4". The annular or cylindrical permanent magnet material 18, i.e., the magnet 12, was dimensioned as 1250 $\mu$m (outer diameter)×350 $\mu$m (inner diameter: $D_3$)×500 $\mu$m (axial length: $T_3$).

Three types of the shaft 16 were provided, which respectively included the intermediate portions 24 having the diameter $d_3$ of 350 m, 355 $\mu$m and 360 $\mu$m. These shafts 16 also included the first end portions 26 having the diameter $e_3$ of 330 $\mu$m. Then, the shafts 16 were respectively inserted into the magnet 12, and the intermediate portions 24 of the shafts 16 were respectively press-fitted into the through hole 20, until the respective axial interengagement lengths $t_3$ of 50 $\mu$m, 70 $\mu$m, 100 $\mu$m, 200 $\mu$m, 300 $\mu$m, 400 $\mu$m, 420 $\mu$m and 450 $\mu$m were obtained. In this way, the three types of shafts 16 were respectively temporarily attached to the magnet 12, under the uniform contact of the entire outer surface of the intermediate portion 24 with the inner surface of the magnet 12 inside the through hole 20, in different engagement conditions (the interference "$d_3$–$D_3$"; the axial interengagement length $t_3$) (a first step).

For the respective types of rotor blanks thus provided, the fixing force (Kgf) for securing the respective shafts 16 or the attaching states of the shafts 16 were estimated. The fixing force was determined by axially pushing the first end portion 26 of the shaft 16 secured in the through hole 20 of the magnet 12 and measuring the force required to shift the shaft 16 in the through hole 20 (or to pull the shaft from the through hole 20). The results of this estimation are shown in Table 7.

TABLE 7

| (Fixing Force (Kgf) or Attaching State: First Step) | | | |
|---|---|---|---|
| | $d_3 - D_3$ ($\mu$m) | | |
| $t_3$ ($\mu$m) | 0 | 5 | 10 |
| 50 | I | I | I |
| 70 | I | I | I |
| 100 | II | 0.02 | III |
| 200 | II | 0.05 | III |
| 300 | 0.02 | 0.07 | III |
| 400 | 0.04 | 0.13 | III |
| 420 | 0.04 | 0.15 | III |
| 450 | 0.05 | 0.16 | III |

(I: misaligned  II: fell out  III: broken)

As shown in the table 7, after the first step, when the axial interengagement length $t_3$ was less than 100 $\mu$m all the shafts 16 were tilted or misaligned in the through hole 20. When the interference $d_3$–$D_3$ between the intermediate portion 24 of the shaft 16 and the magnet 12 inside the through hole 20 was 0 $\mu$m and the axial interengagement length $t_3$ was at most 200 $\mu$m, the misalignment did not occur, but the shaft 16 tended to fall out the through hole 20 during a handling before a second step described below. When the interference $d_3$–$D_3$ was 10 $\mu$m (the diameter $d_3$ of the intermediate portion 24 was 360 $\mu$m), the magnet 12 tended to be broken in certain cases of the axial interengagement lengths $t_3$, during the press-fitting operation of the shaft 16. In the other engagement conditions ($d_3$–$D_3$; $t_3$), the shafts 16 could be temporarily attached on the magnet 12 without causing the misalignment of the shaft 16 and the breaking of the magnet 12.

Then, a large number of (e.g., approximately a million) rotor blanks, to which the shafts 16 are temporarily attached under the above different engagement conditions after the first step, were provided, and put in a beaker of 1 liter. The beaker was then evacuated in a vacuum container up to 0.1 Torr. During this state, a thermosetting liquid epoxy resin, which serves as the adhesive 52, was provided in the beaker, and after that, the vacuum was released to an atmospheric pressure. After the vacuum was released, the beaker may be housed in a pressure container, to be subjected to pressure in a range of 3 Kg/cm² to 5 Kg/cm². Thereafter, all the rotor blanks were transferred into a stainless-steel mesh container, while the most of the liquid epoxy resin was poured out. The reminder of the epoxy resin was washed out in ethanol, so as to prevent the rotor blanks from being stuck together. The washing process may be carried out by an ultrasonic cleaning, which can shorten a time required for washing. Then, the epoxy resin was cured under the condition of 180° C. for three hours. Thereby, the shafts 16 were fixed on the magnets 20 under the different conditions ($d_3$–$D_3$; $t_3$), to complete the plural types of rotors 50 (a second step).

For the respective types of rotors 50 thus completed, the fixing force (Kgf) for securing the respective shafts 16 or the attaching states of the shafts 16 were estimated, in the same manner as in the former estimation after first step. The results of this estimation are shown in Table 8.

TABLE 8

(Fixing Force (Kgf) or Attaching State: Second Step)

| | $d_3$ - $D_3$ ($\mu$m) | | |
|---|---|---|---|
| $t_3$ ($\mu$m) | 0 | 5 | 10 |
| 50 | I | I | I |
| 70 | I | I | I |
| 100 | II | 0.25 | III |
| 200 | II | 0.85 | III |
| 300 | 0.18 | 0.84 | III |
| 400 | 0.15 | 0.54 | III |
| 420 | 0.09 | 0.17 | III |
| 450 | 0.07 | 0.17 | III |

(I: misaligned  II: fell out  III: broken)

As shown in the table 8, after the second step, when the axial interengagement length $t_3$ was in a range of 100 $\mu$m to 400 $\mu$m, the desired fixing force of at least 0.2 Kgf could be obtained. However, when the axial interengagement length $t_3$ exceeded 400 $\mu$m, the fixing force became lower than 0.2 Kgf, and the adhesive 52 was not considered to effectively function.

As will be understood from the results of the above estimations, the rotors 50, having the estimated results underlined in the table 8, provided with the axial interengagement length $t_3$ in the range of 100 $\mu$m to 400 $\mu$m (i.e., $T_3/5 \leq t_3 \leq 4T_3/5$), are preferably adoptable for the invention, wherein the magnet 12 is prevented from being broken or cracked due to the shaft 16, wherein the desired fixing force of at least 0.2 Kgf is obtained, and wherein the misalignment or the falling out of the shaft 16 is eliminated. Such a rotor 50 is suitably used for a miniature electric motor incorporated in an electronic clock or watch.

It should be noted that, in the above experiments, the permanent magnet material 18 may also be formed from SmCo₅ type sintered magnet or NdFeB type sintered magnet, in place of the Sm₂Co₁₇ type sintered magnet, which results in the similar effects.

EXPERIMENT 4

In the rotor 60 shown in FIG. 6, the permanent magnet material 18 was made of a Sm₂C₁₇ type bonded magnet, which included an epoxy resin type binder, and the shaft 16 was made of a carbon steel "JIS SK4". The annular or cylindrical permanent magnet material 18 was dimensioned as 1250 $\mu$m (outer diameter)×350 $\mu$m (inner diameter)×500 $\mu$m (axial length). The coating 62 is made of a Ni—P electroless plating having a coating thickness of 15 $\mu$m.

Accordingly, the inner diameter $D_4$ of the rotor 12 is 320 $\mu$m, and the entire axial length $T_4$ of the through hole 20 is 530 $\mu$m.

Three types of the shaft 16 were provided, which respectively included the intermediate portions 24 having the diameter $d_4$ of 320 $\mu$m, 325 $\mu$m and 330 $\mu$m. These shafts 16 also included the first end portions 26 having the diameter $e_4$ of 300 $\mu$m. Then, the shafts 16 were respectively inserted into the magnet 12, and the intermediate portions 24 of the shafts 16 were respectively press-fitted into the through hole 20, until the respective axial interengagement lengths $t_4$ of 70 $\mu$m, 90 $\mu$m, 120 $\mu$m, 220 $\mu$m, 320 $\mu$m, 420 $\mu$m, 440 $\mu$m and 470 $\mu$m were obtained. In this way, the three types of shafts 16 were temporarily attached to the magnet 12 under the uniform contact of the entire outer surface of the intermediate portion 24 with the inner surface of the magnet 12 inside the through hole 20, in different engagement conditions (the interference "$d_4$–$D_4$"; the axial interengagement length $t_4$) (a first step).

For the respective types of rotor blanks thus provided, the fixing force (Kgf) for securing the respective shafts 16 or the attaching states of the shafts 16 were estimated. The fixing force was determined by axially pushing the first end portion 26 of the shaft 16 secured in the through hole 20 of the magnet 12 and measuring the force required to shift the shaft 16 in the through hole 20 (or to pull out the shaft from the through hole 20). The results of this estimation are shown in Table 9.

TABLE 9

(Fixing Force (Kgf) or Attaching State: First Step)

| | $d_4$ - $D_4$ ($\mu$m) | | |
|---|---|---|---|
| $t_4$ ($\mu$m) | 0 | 5 | 10 |
| 70 | I | I | I |
| 90 | I | I | I |
| 120 | II | 0.04 | III |
| 220 | II | 0.05 | III |
| 320 | II | 0.09 | III |
| 420 | 0.03 | 0.13 | III |
| 440 | 0.05 | 0.14 | III |
| 470 | 0.05 | 0.15 | III |

(I: misaligned  II: fell out  III: broken)

As shown in the table 9, after the first step, when the axial interengagement length $t_4$ was less than 100 $\mu$m all the shafts 16 were tilted or misaligned in the through hole 20. When the interference $d_4$–$D_4$ between the intermediate portion 24 of the shaft 16 and the magnet 12 inside the through hole 20 was 0 $\mu$m and the axial interengagement length $t_4$ was at most 320 $\mu$m, the misalignment did not occur, but the shaft 16 tended to fall out the through hole 20 during handling before a second step described below. When the interference $d_4$–$D_4$ was 10 $\mu$m (the diameter $d_4$ of the intermediate portion 24 was 330 $\mu$m), the magnet 12 tended to be broken in certain cases of the axial interengagement lengths $t_4$, during the press-fitting operation of the shaft 16. In the other engagement conditions ($d_4$–$D_4$; $t_4$), the shafts 16 could be temporarily attached to the magnet 12 without causing the misalignment of the shaft 16 and the breaking of the magnet 12.

Then, a large number of (e.g., approximately a million) rotor banks, to which the shafts 16 are temporarily attached under the above different engagement conditions after the first step, were provided, and put in a beaker of 1 liter. The beaker was then evacuated in a vacuum container up to 0.1

Torr. During this state, a thermosetting liquid epoxy resin, which serves as the adhesive 52, was provided in the beaker, and after that, the vacuum was released to an atmospheric pressure. After the vacuum was released, the beaker may be housed in a pressure container, to be subjected to pressure in a range of 3 Kg/cm² to 5 Kg/cm². Thereafter, all the rotor blanks were transferred into a stainless-steel mesh container, while the most of the liquid epoxy resin was poured out. The reminder of the epoxy resin was washed out in ethanol, so as to prevent the rotor blanks from being stuck together. The washing process may be carried out by an ultrasonic cleaning, which can shorten the time required for washing. Then, the epoxy resin is cured under the condition of 180° C. for three hours. Thereby, the shafts 16 were fixed on the magnets 20 under the different conditions ($d_4$–$D_4$; $t_4$), to complete the plural types of rotors 60 (a second step).

For the respective types of rotors 60 thus completed, the fixing force (Kgf) for securing the respective shafts 16 or the attaching states of the shafts 16 were estimated, in the same manner as in the former estimation after the first step. The results of this estimation is shown in Table 10.

TABLE 10

(Fixing Force (Kgf) or Attaching State: Second Step)

| | $d_4$ - $D_4$ (μm) | | |
|---|---|---|---|
| $t_4$ (μm) | 0 | 5 | 10 |
| 70 | I | I | I |
| 90 | I | I | I |
| 120 | II | 0.28 | III |
| 220 | II | 0.78 | III |
| 320 | II | 0.76 | III |
| 420 | 0.14 | 0.45 | III |
| 440 | 0.10 | 0.16 | III |
| 470 | 0.08 | 0.17 | III |

(I: misaligned  II: fell out  III: broken)

As shown in the table 10, after the second step, when the axial interengagement length $t_4$ was in a range of 120 μm to 420 μm, the desired fixing force of at least 0.2 Kgf could be obtained. However, when the axial interengagement length $t_4$ exceeded 420 μm, the fixing force became lower than 0.2 Kgf, and the adhesive 52 was not considered to effectively function.

As will be understood from the results of the above estimations, the rotors 60, having the estimated results underlined in the table 10, provided with the axial interengagement length $t_4$ in the range of 106 μm to 424 μm (i.e., $T_4/5 \leq t_4 \leq 4T_4/5$), are preferably adoptable for the invention, wherein the magnet 12 is prevented from being broken or cracked due to the shaft 16, wherein the desired fixing force of at least 0.2 Kgf is obtained, and wherein the misalignment or the falling out of the shaft 16 is eliminated. Such a rotor 60 is suitably used for a miniature electric motor incorporated in an electronic clock or watch.

It should be noted that, in the above experiments, the permanent magnet material 18 may also be formed from $SmCO_5$ type bonded magnet, NdFeB type bonded magnet, or SmFeN type bonded magnet, in place of the $Sm_2Co_{17}$ type bonded magnet, which results in the similar effects. Further, in the above experiments, the coating 62 may also be formed from a deposited coat of poly-para-xylene having a coating thickness of 25 μm, as an organic substance layer which results in the similar effects.

While the invention has been described with reference to preferred embodiments thereof, various changes and modifications may be made for the present invention within the disclosure of the following claims.

INDUSTRIAL APPLICABILITY

The present invention provides a rotor for use in a miniature electric motor, which has a high structural reliability and can be produced with a high yield and a relatively low cost. The rotor of the present invention, designed to include an annular or cylindrical magnet and a shaft fixed to the magnet, can prevent the magnet from being broken or cracked due to the shaft, and can ensure large and stable fixing force for securing the shaft in a predetermined position on the magnet. Accordingly, it can be suitably adopted for a rotor having a relatively fragile magnet, such as a simply molded or bonded magnet.

We claim:

1. A rotor for an electric motor, comprising:
    a magnet having a rotation axis, said magnet being provided with a through hole having opposite open ends and extending coaxially with said rotation axis;
    a shaft fixed concentrically to said magnet, said shaft having a stepped outer surface and including a first portion fitted in said through hole, said first portion having an axial interengagement length from one of said opposite open ends that is in engagement with an inside surface of said through hole and that is shorter than an axial length of said through hole, a second portion thinner than and adjacent to said first portion and that is not in engagement with an inside surface of said through hole, and a toothed wheel adjacent to an end of said first portion opposite from said second portion; and
    reinforcing means provided at least inside said through hole for securely fixing said shaft in a predetermined position in said magnet.

2. A rotor as set forth in claim 1, wherein said magnet comprises an annular magnet material and said reinforcing means comprises a coating formed at least on an inside surface of the through hole of said magnet material, said axial interengagement length of said first portion of said shaft being engaged with said coating in a face-to-face manner.

3. A rotor as set forth in claim 2, wherein said coating is made of a metal plating.

4. A rotor as set forth in claim 3, wherein said metal plating is an electroless plating.

5. A rotor as set forth in claim 3, wherein said metal plating includes at least one of a Ni—P electroless plating, a Ni—B electroless plating and a Ni—P—W electroless plating.

6. A rotor as set forth in claim 3, wherein said metal plating is a single layer coating having a thickness of at least 10 μm.

7. A rotor as set forth in claim 3, wherein said metal plating includes an electroless plating base layer and an electroplating top layer.

8. A rotor as set forth in claim 7, wherein said electroplating top layer is a Ni electroplating.

9. A rotor as set forth in claim 7, wherein said electroless plating base layer has a thickness in a range of 0.5 μm to 2.0 μm.

10. A rotor as set forth in claim 7, wherein said electroplating top layer has a thickness of at least 3.0 μm.

11. A rotor as set forth in claim 3, wherein said magnet material is made of a bonded magnet material.

12. A rotor as set forth in claim 11, wherein said bonded magnet material is vacuum-impregnated with a bonding agent or filler.

13. A rotor as set forth in claim 1, wherein said reinforcing means comprises an adhesive filled in a clearance defined between said second portion of said shaft and an inside surface of said through hole of said magnet.

14. A rotor as set forth in claim 13, wherein said adhesive is made of a thermosetting epoxy resin.

15. A rotor as set forth in claim 13, wherein said magnet comprises an annular magnet material and said reinforcing means further comprises a coating formed at least on an inside surface of the through hole of said magnet material, said axial interengagement length of said first portion of said shaft being engaged with said coating in a face-to-face manner.

16. A rotor as set forth in claim 15, wherein said coating is made of a metal plating.

17. A rotor as set forth in claim 15, wherein said coating is made of an organic substance layer.

18. A rotor as set forth in claim 15, wherein said magnet material is made of a bonded magnet material.

19. A rotor as set forth in claim 1, wherein said magnet contains rare-earth elements.

20. A method of producing a rotor for an electric motor, comprising the steps of:
    forming a coating on at least an inside surface of a through hole of an annular magnet material having a rotation axis, said through hole having opposite open ends and extending coaxially with said rotation axis;
    providing a shaft having a stepped outer surface and including a first portion capable of being fitted in said through hole, a second portion thinner than and adjacent to said first portion, and a toothed wheel adjacent to an end of said first portion opposite from said second portion; and
    inserting said first and second portions of said shaft into said through hole of said magnet until an axial interengagement length of said first portion from one of said opposite open ends, shorter than an axial length of said through hole, is engaged in a tightly press-fit manner with said coating while the second portion of said shaft is not in engagement with said coating.

21. A method as set forth in claim 20, wherein said magnet material is made of a bonded magnet material, wherein said coating is a metal plating, and further including a step of vacuum-impregnating said bonded magnet material with an adhesive before said step of forming said coating.

22. A method as set forth in claim 20, wherein an interference of said first portion in said through hole is adjusted by changing a thickness of said coating.

23. A method of producing a rotor for an electric motor, comprising the steps of:
    providing a magnet having a rotation axis and a through hole with opposite open ends extending coaxially with said rotation axis;
    providing a shaft having a stepped outer surface and including a first portion capable of being fitted in said through hole, a second portion axially adjacent to and thinner than said first portion for defining a clearance inside said through hole, and a toothed wheel adjacent to an end of said first portion opposite from said second portion;
    inserting said shaft into said through hole of said magnet and fitting said first portion of said shaft in said through hole, until an axial interengagement length of said first portion from one of the opposite ends of the through hole, shorter than an axial length of said through hole, is obtained; and
    filling an adhesive in said clearance inside said through hole.

24. A method as set forth in claim 23, wherein said adhesive is vacuum-impregnated into said clearance.

25. A method as set forth in claim 23, wherein said magnet is made of an annular bonded magnet material, and further including a step of forming a coating on a surface of said bonded magnet material before said step of inserting said shaft.

26. A rotor for an electric motor, comprising:
    a magnet having a rotation axis, said magnet being provided with a through hole extending coaxially with said rotation axis;
    a shaft fixed concentrically to said magnet, said shaft including a first portion fitted in said through hole, said first portion having an axial interengagement length that is in engagement with an inside surface of said through hole and is shorter than an axial length of said through hole and a second portion that is not in engagement with an inside surface of said through hole; and
    reinforcing means provided at least inside said through hole for securely fixing said shaft in a predetermined position in said magnet;
    said magnet comprising an annular bonded magnet material and said reinforcing means comprising a metal plating formed at least on an inside surface of the through hole of said magnet material, and said axial interengagement length of said first portion of said shaft being engaged with said coating in a face-to-face manner;
    wherein a dimensional relationship between said axial interengagement length of said first portion of said shaft and said axial length of said through hole is defined as $T/5 \leq t \leq T/2$, in which "T" is said through hole axial length and "t" is said axial interengagement length.

27. A rotor for an electric motor, comprising:
    a magnet having a rotation axis, said magnet being provided with a through hole extending coaxially with said rotation axis;
    a shaft fixed concentrically to said magnet, said shaft including a first portion fitted in said through hole, said first portion having an axial interengagement length that is in engagement with an inside surface of said through hole and is shorter than an axial length of said through hole and a second portion that is not in engagement with an inside surface of said through hole; and
    reinforcing means provided at least inside said through hole for securely fixing said shaft in a predetermined position in said magnet;
    said magnet comprising an annular bonded magnet material and said reinforcing means comprising a metal plating formed at least on an inside surface of the through hole of said magnet material, and said axial interengagement length of said first portion of said shaft being engaged with said coating in a face-to-face manner;

wherein said first portion of said shaft is tightly press-fitted in said through hole of said magnet, and wherein an interference of said first portion in said through hole is in a range of 5 μm to 30 μm.

28. A rotor for an electric motor, comprising:
a magnet having a rotation axis, said magnet being provided with a through hole extending coaxially with said rotation axis;
a shaft fixed concentrically to said magnet, said shaft including a first portion fitted in said through hole, said first portion having an axial interengagement length that is in engagement with an inside surface of said through hole and is shorter than an axial length of said through hole and a second portion that is not in engagement with an inside surface of said through hole; and
reinforcing means provided at least inside said through hole for securely fixing said shaft in a predetermined position in said magnet;
wherein said reinforcing means comprises an adhesive filled in a clearance defined between said second portion of said shaft and an inside surface of said through hole of said magnet, and
wherein a dimensional relationship between said axial interengagement length of said first portion of said shaft and said axial length of said through hole is defined as $T/5 \leq t \leq 4T/5$, in which "T" is said through hole axial length and "t" is said axial interengagement length.

* * * * *